United States Patent
Takagi et al.

(10) Patent No.: US 11,952,474 B2
(45) Date of Patent: Apr. 9, 2024

(54) FOAM PARTICLES

(71) Applicant: JSP Corporation, Tokyo (JP)

(72) Inventors: Shota Takagi, Fuji (JP); Akinobu Hira, Yokkaichi (JP)

(73) Assignee: JSP Corporation, Tokyo (JP)

( * ) Notice: Subject to any disclaimer, the term of this patent is extended or adjusted under 35 U.S.C. 154(b) by 523 days.

(21) Appl. No.: 17/289,169

(22) PCT Filed: Oct. 2, 2019

(86) PCT No.: PCT/JP2019/038917
§ 371 (c)(1),
(2) Date: Apr. 27, 2021

(87) PCT Pub. No.: WO2020/090335
PCT Pub. Date: May 7, 2020

(65) Prior Publication Data
US 2021/0395481 A1 Dec. 23, 2021

(30) Foreign Application Priority Data

Oct. 30, 2018 (JP) .................. 2018-204236

(51) Int. Cl.
| | |
|---|---|
| *C08J 9/18* | (2006.01) |
| *C08J 9/00* | (2006.01) |
| *C08J 9/228* | (2006.01) |
| *C08L 53/00* | (2006.01) |

(52) U.S. Cl.
CPC .............. *C08J 9/18* (2013.01); *C08J 9/0061* (2013.01); *C08J 9/228* (2013.01); *C08L 53/00* (2013.01); *C08J 2203/22* (2013.01); *C08J 2353/00* (2013.01); *C08J 2423/06* (2013.01); *C08L 2203/14* (2013.01)

(58) Field of Classification Search
CPC ... C08J 9/18; C08J 9/0061; C08J 9/228; C08J 2203/22; C08J 2353/00; C08J 2423/06; C08J 9/122; C08J 9/232; C08J 2201/026; C08J 2203/06; C08J 9/16; C08L 53/00; C08L 2203/14; C08L 23/08; C08L 2207/062
See application file for complete search history.

(56) References Cited

U.S. PATENT DOCUMENTS

| | | | | |
|---|---|---|---|---|
| 6,028,121 A | * | 2/2000 | Takeda ................ | C08L 23/06 521/142 |
| 6,455,602 B1 | * | 9/2002 | Maki .................... | C08J 9/04 521/142 |
| 2002/0143077 A1 | | 10/2002 | Sueda et al. | |
| 2009/0029143 A1 | | 1/2009 | Kanae et al. | |
| 2009/0137741 A1 | | 5/2009 | Natsuyama | |
| 2016/0319095 A1 | | 11/2016 | Yoshida et al. | |
| 2019/0263994 A1 | | 8/2019 | Takagi et al. | |
| 2019/0276627 A1 | | 9/2019 | Takagi et al. | |
| 2021/0060833 A1 | | 3/2021 | Takagi et al. | |

FOREIGN PATENT DOCUMENTS

| | | |
|---|---|---|
| CN | 1369520 A | 9/2002 |
| CN | 101155864 A | 4/2008 |
| CN | 101497716 A | 8/2009 |
| CN | 105849167 A | 8/2016 |
| EP | 3970959 A1 | 3/2022 |
| JP | 2000-154270 A | 6/2000 |
| JP | 2010-126577 A | 6/2010 |
| JP | 2010-159321 A | 7/2010 |
| JP | 2013-181157 A | 9/2013 |
| JP | 2016-155344 A | 9/2016 |
| JP | 2016-160300 A | 9/2016 |
| JP | 2016-216527 A | 12/2016 |
| JP | 2018-070735 A | 5/2018 |
| WO | 2013/099550 A1 | 7/2013 |
| WO | 2018/084245 A1 | 5/2018 |
| WO | 2018/088428 A1 | 5/2018 |
| WO | 2018/088429 A1 | 5/2018 |
| WO | 2018/088551 A1 | 5/2018 |

OTHER PUBLICATIONS

International Search Report for PCT/JP2019/038917, dated Jan. 7, 2020, and English Translation submitted herewith (5 pages).
Ruixue et al., Polymer Materials, 2018 (8 pages).
EPO: Application No. 19879789.6; Official Communication dated May 16, 2023, 42 pages.
Extended European Search Report issued in corresponding EP Application No. 19879789.6 dated Jun. 20, 2022 (9 pages).

* cited by examiner

*Primary Examiner* — Irina S Zemel

(74) *Attorney, Agent, or Firm* — Fitch, Even, Tabin & Flannery, LLP

(57) ABSTRACT

Expanded beads are those including a mixture of an olefin-based thermoplastic elastomer and a polyethylene-based resin, wherein a melt flow rate MFR(I) of the olefin-based thermoplastic elastomer is 2-10 g/10 min; a difference ((MFR(II))−(MFR(I))) between a melt flow rate MFR(II) of the polyethylene-based resin and the melt flow rate MFR(I) of the olefin-based thermoplastic elastomer is 1-35 g/10 min; and a content of the polyethylene-based resin in the mixture is 3-40% by weight.

9 Claims, No Drawings

FOAM PARTICLES

CROSS-REFERENCE TO RELATED APPLICATIONS

This application is a U.S. national phase application filed under 35 U.S.C. § 371 of International Application Number PCT/JP2019/038917, filed Oct. 2, 2019, designating the United States, which claims priority from Japanese Application Number 2018-204236, filed Oct. 30, 2018.

FIELD OF THE INVENTION

The present invention relates to expanded beads comprised of a mixture of an olefin-based thermoplastic elastomer and a polyethylene-based resin.

BACKGROUND OF THE INVENTION

Olefin-based thermoplastic elastomers which have excellent flexibility and impact resilience are used in various applications such as cushioning materials, resilient isolators, sporting goods, automobile parts, etc.

Since expanded beads molded articles of such olefin-based thermoplastic elastomers are able to have a reduced weight while maintaining excellent properties inherent to the olefin-based thermoplastic elastomer, such as flexibility and impact resilience, there are expectations for development of further applications thereof in sporting goods, automobile parts, building materials, etc.

In connection with such an olefin-based thermoplastic elastomer, Patent Document 1, for example, discloses crosslinked expanded beads obtained by crosslinking and expanding particles of a multiblock copolymer of a polyethylene block and an ethylene/α-olefin copolymer block. The crosslinked expanded beads have excellent in-mold moldability and permit production of an expanded beads molded article having excellent balance of lightness in weight, flexibility, resilience, recoverability and tensile properties.

PRIOR ART DOCUMENT

Patent Document

[Patent Document 1] Japanese Kokai Publication JP2016-216527

SUMMARY OF THE INVENTION

Expanded beads molded articles should be occasionally used in a high temperature atmosphere depending on their application purpose. However, expanded beads molded article of an olefin-based thermoplastic elastomer sometimes undergoes volume shrinkage in a high temperature atmosphere to cause a change in its dimensions. Therefore, it has been desired to realize expanded beads that are excellent in tensile properties, flexibility, moldability, etc. and, yet, that are capable of forming expanded beads molded articles having more excellent heat resistance.

The present invention has been made in view of the existence of the above-mentioned problems and aims at provision of expanded beads that are capable of forming an expanded beads molded article having excellent heat resistance while maintaining excellent properties of olefin-based thermoplastic elastomer expanded beads such as tensile properties, flexibility, moldability, etc.

In accordance with a first aspect of the present invention, there is provided expanded beads as follows:

[1] Expanded beads comprising a mixture consisting of 60 to 97% by weight of an olefin-based thermoplastic elastomer and 3 to 40% by weight of a polyethylene-based resin, said olefin-based thermoplastic elastomer having a melt flow rate MFR(I) and said polyethylene-based resin having a melt flow rate MFR(II), wherein MFR(I) is 2 to 10 g/10 min and a difference [MFR(II)−MFR(I)] between MFR(II) and MFR(I) is 1 to 35 g/10 min.

[2] Expanded beads according to above [1], wherein the olefin-based thermoplastic elastomer is a block copolymer having a hard segment comprised of a polyethylene block and a soft segment comprised of an ethylene/α-olefin copolymer block.

[3] Expanded beads according to above [1] or [2], wherein the polyethylene-based resin is one or two or more polyethylene-based resins selected from the group consisting of high density polyethylene and linear low density polyethylene.

[4] Expanded beads according to any one of above [1] to [3], wherein the polyethylene-based resin is high density polyethylene.

[5] Expanded beads according to any one of above [1] to [4], wherein the difference [MFR(II)−MFR(I)] between the melt flow rate MFR(II) of the polyethylene-based resin and the melt flow rate MFR(I) of the olefin-based thermoplastic elastomer is 1 to 25 g/10 min.

[6] Expanded beads according to any one of above [1] to [5], wherein the mixture of an olefin-based thermoplastic elastomer and a polyethylene-based resin has such a crystal structure that shows a single endothermic peak in a DSC curve thereof measured based on JIS K7121 (2012).

[7] Expanded beads according to any one of above [1] to [6] which have a hot xylene insolubles content of 10 to 70% by weight.

[8] Expanded beads according to any one of above [1] to [7] which have an apparent density of 30 to 150 kg/m$^3$.

In another aspect, the present invention provides:

[9] An expanded beads molded article, comprising a multiplicity of the expanded beads according to any one of above [1] to [8] that are fusion-bonded to each other.

The expanded beads of the present invention can be molded into an expanded beads molded articles having excellent heat resistance while maintaining excellent properties of olefin-based thermoplastic elastomer expanded beads such as tensile properties, flexibility, moldability etc.

EMBODIMENTS OF THE INVENTION

An expanded beads molded article of an olefin-based thermoplastic elastomer may occasionally show insufficient heat resistance depending upon its application purpose. For example, a volume shrinkage may occur in a high temperature atmosphere of 80° C. or 100° C. to cause a dimensional change. The reason for such volume shrinkage of the olefin-based thermoplastic elastomer expanded beads molded article in a high temperature atmosphere is considered to be as follows. When the olefin-based thermoplastic elastomer expanded beads are subjected to in-mold molding, the expanded beads that have been heated undergo secondary expansion. At this time, distortion is caused in the olefin-based thermoplastic elastomer expanded beads. One of the causes of the volume shrinkage is considered to be that the distortion remains present in the expanded beads molded article. It is considered that since the olefin-based thermoplastic elastomer is more elastic than a polyolefin-based resin or the like resin, strain is more likely to remain in the expanded beads molded article and, hence, volume shrinkage is likely to occur particularly in a high temperature atmosphere.

The expanded beads of the present invention, which comprise a mixture of an olefin-based thermoplastic elastomer and a polyethylene-based resin, are capable of molding an expanded beads molded article (hereinafter occasionally simply referred to as "molded article") that have excellent heat resistance while maintaining excellent properties of the olefin-based thermoplastic elastomer expanded beads such as tensile properties, flexibility, moldability, etc. Although the reason why the expanded beads of the present invention can form an expanded beads molded article having excellent heat resistance has not yet been clarified, the following reasons may be considered.

The expanded beads of the present invention contain a specific polyethylene-based resin in addition to an olefin-based thermoplastic elastomer. It is, thus, considered that the polyethylene-based resin may serve to relax the strain of the cell walls that has been caused by the olefin-based thermoplastic elastomer of the expanded beads during in-mold molding, so that an expanded beads molded article having reduced volume shrinkage and excellent heat resistance even in a high temperature atmosphere is obtained.

<Expanded Beads>

The expanded beads of the present invention are comprised of a mixture consisting of 60 to 97% by weight of an olefin-based thermoplastic elastomer and 3 to 40% by weight of a polyethylene-based resin, provided that the total of the olefin-based thermoplastic elastomer and the polyethylene-based resin is 100% by weight. The olefin-based thermoplastic elastomer has a melt flow rate MFR(I) and the polyethylene-based resin has a melt flow rate MFR(II). MFR(I) is 2 to 10 g/10 min, and a difference [MFR(II)–MFR(I)] between MFR(I) and MFR(II) is 1 to 35 g/10 min.

[Olefin-Based Thermoplastic Elastomer (TPO)]

The expanded beads of the present invention include an olefin-based thermoplastic elastomer (hereinafter occasionally simply referred to as TPO).

As TPO, there may be mentioned, for example, a mixture comprised of a hard segment formed of a propylene-based resin and a soft segment formed of an ethylene-based rubber, and a block copolymer having a hard segment formed of a polyethylene block and a soft segment formed of an ethylene/α-olefin copolymer block. Preferably used among these TPO is a block copolymer having a hard segment formed of a polyethylene block and a soft segment formed of an ethylene/α-olefin copolymer block. When a block copolymer having a hard segment formed of a polyethylene block and a soft segment formed of an ethylene/α-olefin copolymer block is used as TPO, it possible to obtain expanded beads molded article having better heat resistance while maintaining excellent desirable properties of TPO.

In the mixture comprised of a hard segment formed of a propylene-based resin and a soft segment formed an ethylene-based rubber, the propylene-based resin may be, for example, a propylene homopolymer or a copolymer of propylene and ethylene or an α-olefin having 4 to 8 carbon atoms. As the ethylene-based rubber, on the other hand, there may be mentioned, for example, a copolymer of ethylene and an α-olefin having 3 to 8 carbon atoms, and a copolymer of ethylene and a non-conjugated diene such as 5-vinyl-2-norbornene, 5-ethylidene-2-norbornene, 5-methylene-2-norbornene and dicyclopentadiene.

In the block copolymer having a hard segment formed of a polyethylene block and a soft segment formed of an ethylene/α-olefin copolymer block, the polyethylene block may be, for example, an ethylene homopolymer and a copolymer of ethylene and an α-olefin having 3 to 8 carbon atoms. On the other hand, the ethylene/α-olefin copolymer block may be a block of a copolymer of ethylene and an α-olefin having 3 to 20 carbon atoms. As the α-olefin that is copolymerized with ethylene, there may be mentioned propylene, 1-butene, 1-pentene, 1-hexene, 1-heptene, 1-octene, 1-nonene, 1-decene, 3-methyl-1-butene, 4-methyl-1-pentene, etc. Above all, the α-olefin to be copolymerized with ethylene is preferably propylene, 1-butene, 1-hexene or 1-octene, from the standpoint of industrial availability, various properties, cost efficiency and the like. Particularly preferred is 1-octene.

The proportion of the ethylene units in the polyethylene block is preferably 95% by weight or more, more preferably 98% by weight or more, based on the weight of the polyethylene block. The proportion of the α-olefin units in the ethylene/α-olefin copolymer block, on the other hand, is preferably 5% by weight or more, more preferably 10% by weight, still more preferably 15% by weight or more, based on the weight of the ethylene/α-olefin copolymer block. The proportion of the polyethylene blocks and the proportion of the ethylene/α-olefin copolymer blocks may be calculated on the basis of data obtained by differential scanning calorimetry (DSC) or nuclear magnetic resonance (NMR).

(Melt Flow Rate of TPO)

The melt flow rate MFR(I) of the olefin-based thermoplastic elastomer is 2 to 10 g/10 min, preferably 3 to 8 g/10 min, more preferably 4 to 7 g/10 min. When MFR(I) is excessively low, the fusion-bonding ability of the expanded beads becomes low, so that there is a possibility that it becomes difficult to produce an expanded beads molded article by in-mold molding of the expanded beads. When MFR(I) is excessively high, on the other hand, there is a possibility that an expanded beads molded article obtained by in-mold molding of the expanded beads fails to show desired physical properties. As used herein, the melt flow rate MFR(I) of the olefin-based thermoplastic elastomer is a value as measured under the conditions of a temperature of 190° C. and a load of 2.16 kg in accordance with JIS K7210-1(2014).

(Density of TPO)

The density of TPO is preferably 700 to 1,000 kg/m$^3$, more preferably 800 to 900 kg/m$^3$.

(Melting Point of TPO)

The melting point of TPO is preferably 110 to 140° C., more preferably 115 to 135° C. from the standpoint of heat resistance, etc. of the expanded beads molded article. The melting point of TPO as used herein is intended to refer to the melting peak temperature measured on the basis of heat flux differential scanning calorimetry described in JIS K7121(2012). As sample adjusting conditions, "(2) When measuring the melting temperature after performing a determined heat treatment" is adopted. A heating rate and a cooling rate adopted are both 10° C./min. When a plurality of melting peaks appear on the DSC curve, the melting point is the peak top temperature of the melting peak having the largest area.

(Heat of Fusion of TPO)

The heat of fusion of TPO is preferably 20 to 80 J/g, more preferably 30 to 70 J/g. When the heat of fusion of TPO is within the above range, it is possible to obtain an expanded beads molded article having more excellent heat resistance. The heat of fusion of TPO is measured using a heat flux differential scanning calorimeter on the basis of JIS K7122 (2012). When a plurality of melting peaks appear on the DSC curve, the total area of the plurality of melting peaks is taken as the heat of fusion.

(Crystallization Temperature of TPO)

The crystallization temperature of TPO is preferably 80 to 120° C. When the crystallization temperature of TPO is within the above range, the expanded beads show more excellent in-mold moldability. From the above point of view, the crystallization temperature of TPO is more preferably 85 to 115° C. The crystallization temperature of TPO is measured by using a heat flux differential scanning calorimeter on the basis of JIS K7121(2012). When a plurality of crystallization peaks appear on the DSC curve, the peak top temperature of the crystallization peak having the highest peak height is taken as the crystallization temperature.

(Durometer a Hardness of TPO)

The durometer hardness (HDA) of TPO, measured using a Type A durometer, is preferably 65 to 95, more preferably 70 to 90. When the durometer A hardness of TPO is within the above range, an expanded beads molded article having more excellent flexibility can be obtained. The durometer hardness (HDA) of TPO is a value as measured according to JIS K7215(1986).

(Flexural Modulus of TPO)

The flexural modulus of TPO is preferably 10 to 50 MPa, more preferably 15 to 40 MPa, still more preferably 20 to 35 MPa, from the standpoint of in-mold moldability, flexibility, etc. The flexural modulus of TPO is a value as measured according to JIS K7171(2016).

As TPO, commercially available products may be used; and there may be mentioned, for example, "INFUSE" (product name) manufactured by Dow Chemical Company, "AFFINITY" (product name) manufactured by Dow Chemical Company, "THERMOLAN" (product name) manufactured by Mitsubishi Chemical Corporation, "MILASTOMER" (product name) manufactured by Mitsui Chemicals, Inc., "TAFMER" (product name) manufactured by Mitsui Chemicals, Inc., "SUMITOMO TPE" (product name) manufactured by Sumitomo Chemical Co., Ltd. and "PRIME TPO" (product name) manufactured by Prime Polymer Co., Ltd.

[Polyethylene-Based Resin]

The expanded beads of the present invention include a polyethylene-based resin in addition to TPO. As the polyethylene-based resin, there may be mentioned ethylenic hydrocarbon homopolymers such as very low density polyethylene (VLDPE), low density polyethylene (LDPE), linear low density polyethylene (LLDPE), medium density polyethylene (MDPE) and high density polyethylene (HDPE). These polyethylene-based resins may be used singly or in combination of two or more.

Above all, the polyethylene-based resin is preferably one or two or more polyethylene-based resins selected from high-density polyethylene and linear low-density polyethylene from the standpoint of heat resistance, etc. When the polyethylene-based-based resin is one or two or more polyethylene-based resins selected from high-density polyethylene and linear low-density polyethylene, the obtained expanded beads have more excellent heat resistance. The reason for this has not yet been clarified, but is considered to be that the high-density polyethylene and the linear low-density polyethylene have a high degree of crystallinity so that the crystals are more easily oriented during foaming.

In particular, when a block copolymer having a hard segment formed of a polyethylene block and a soft segment formed of an ethylene/α-olefin copolymer block is used as the TPO, the obtained expanded beads show further excellent heat resistance, since the compatibility between the TPO and the polyethylene-based resin is more excellent so that distortion of cell walls during in-mold molding is more easily relaxed.

(Melt Flow Rate of Polyethylene-Based Resin)

The melt flow rate MFR(II) of the polyethylene-based resin is preferably 2 to 50 g/10 min, more preferably 5 to 40 g/10 min, still more preferably 8 to 35 g/10 min. When the MFR(II) falls within the above range, the expanded beads have more excellent expandability, moldability, etc. In addition, the obtained expanded beads molded article is more excellent in heat resistance, etc. The melt flow rate MFR(II) of the polyethylene-based resin is measured by the same method as the melt flow rate MFR(I) of TPO.

(Density of Polyethylene-Based Resin)

The density of the polyethylene-based resin is preferably 910 to 1,000 kg/m$^3$, more preferably 920 to 980 kg/m$^3$, still more preferably 930 to 960 kg/m$^3$ from the standpoint of heat resistance, etc.

(Melting Point of Polyethylene-Based Resin)

The melting point of the polyethylene-based resin is preferably 110 to 145° C., more preferably 120 to 140° C., still more preferably 125 to 135° C., from the standpoint of moldability, heat resistance, etc. The melting point of the polyethylene-based resin is measured by the same method as the melting point of TPO.

(Heat of Fusion of Polyethylene-Based Resin)

The polyethylene-based resin preferably used in the present invention is one which has heat of fusion higher than that of TPO. When the heat of fusion of the polyethylene-based resin is higher than that of TPO, the obtained expanded beads molded article has more excellent heat resistance. From the above point of view, the heat of fusion of the polyethylene-based resin is preferably 40 to 120 J/g, more preferably 50 to 110 J/g. The heat of fusion of the polyethylene-based resin is measured by the same method as the heat of fusion of TPO.

(Crystallization Temperature of Polyethylene-Based Resin)

The crystallization temperature of the polyethylene-based resin is preferably 90 to 130° C. When the crystallization temperature of the polyethylene-based resin falls within the above range, the degree of shrinkage of the obtained expanded beads molded article becomes smaller. From the above point of view, the crystallization temperature of the polyethylene-based resin is more preferably 100 to 125° C. The crystallization temperature of the polyethylene-based resin is preferably higher than the crystallization temperature of the TPO. The crystallization temperature of the polyethylene-based resin is measured by the same method as the crystallization temperature of TPO.

(Flexural Modulus of Polyethylene-Based Resin)

A flexural modulus of the polyethylene-based resin is preferably 100 to 1,000 MPa. When the flexural modulus of the polyethylene-based resin falls within the above range, the obtained expanded beads molded article has excellent heat resistance while maintaining excellent flexibility of TPO. From the above point of view, the flexural modulus of the polyethylene-based resin is more preferably 300 to 950 MPa, still more preferably 500 to 900 MPa. The flexural modulus of the polyethylene-based resin is measured by the same method as that of TPO.

(Mixture of TPO and Polyethylene-Based Resin)

The content of the polyethylene-based resin in the mixture of the olefin-based thermoplastic elastomer and the polyethylene-based resin is 3 to 40% by weight, provided that a total of the olefin-based thermoplastic elastomer and the polyethylene-based resin is 100% by weight. When the content of the polyethylene-based resin in the mixture is excessively low, there is a possibility that the heat resistance, expandability, moldability, etc. of the expanded beads are not sufficiently improved. When the content of the polyethylene-based resin in the mixture is excessively large, on the other hand, the excellent properties of the olefin-based thermoplastic elastomer such as flexibility, tensile properties, recoverability and resilience may not be maintained. From the above point of view, the content of the polyethylene-based resin in the mixture is preferably 5 to 35% by weight, more preferably 8 to 30% by weight, and still more preferably 10 to 25% by weight.

(Other Polymers)

The expanded beads of the present invention contain a mixture of an olefin-based thermoplastic elastomer and a polyethylene-based resin as a base polymer. As used herein, the term "base polymer" is intended to refer to any polymeric material capable of forming expanded beads each having a multiplicity of cells. The base polymer constituting the expanded beads of the present invention may contain a polymer other than the above-mentioned mixture as long as the effects of the present invention are not adversely affected. Examples of other polymers include thermoplastic resins such as a polypropylene-based resin, a polybutene-based resin and a polystyrene-based resin, and thermoplastic elastomers other than olefinic elastomers (for example, a polybutadiene-based elastomer and a block copolymer such as styrene-butadiene, styrene-isoprene, styrene-butadiene-styrene, styrene-isoprene-styrene and a hydrogenated product thereof). A content of such other polymers in the base polymer is preferably 10 parts by weight or less, more preferably 5 parts by weight or less, based on 100 parts by weight of the base polymer. It is particularly preferred that the base polymer in the present invention is substantially free of polymers other than the mixture of the olefin-based thermoplastic elastomer and the polyethylene-based resin.

(Other Additives)

The expanded beads of the present invention may contain various additives in addition to the base polymer as long as the effects of the present invention are not adversely affected. Examples of the additives include antioxidants, ultraviolet ray inhibitors, antistatic agents, flame retardants, flame retardant aids, metal deactivators, conductive fillers, cell controlling agents, etc. Examples of the cell controlling agents include an inorganic powder such as zinc borate, talc, calcium carbonate, borax, aluminum hydroxide, silica, zeolite, carbon, etc. and an organic powder such as a phosphoric acid type nucleating agent, a phenol type nucleating agent, an amine type nucleating agent, a polyfluoroethylene resin powder, etc.

A total addition amount of these additives is preferably 20 parts by weight or less, more preferably 10 parts by weight or less, still more preferably 5 parts by weight or less, based on 100 parts by weight of the base polymer. These additives are generally used in the minimum necessary amount. Incidentally, these additives may be added to base polymer particles during the production of the base polymer particles by, for example, a method including introducing the additives into an extruder together with the base polymer, and kneading them.

In the present invention, a difference [MFR(II)−MFR(I)] between the melt flow rate MFR(II) of the polyethylene-based resin and the melt flow rate MFR(I) of the olefin-based thermoplastic elastomer is 1 to 35 g/10 min. When the difference [MFR(II)−MFR(I)] is less than 1 g/10 min, the shape of the expanded beads tends to be flattened, so that there is a possibility that expanded beads suitable for in-mold molding fail to be obtained. When the difference [MFR(II)−MFR(I)] exceeds 35 g/10 min, on the other hand, there is a possibility that the moldability and the like property of the obtained expanded beads are deteriorated.

In particular, it is preferred that a polyethylene-based resin that provides a difference [(MFR(II)−MFR(I)] in the range of 1 to 25 g/10 min is contained, since more excellent expandability is obtainable. Namely, such expanded beads of the present invention are spherical, have excellent moldability, and allow molding of a lighter expanded beads molded article. From the above point of view, the difference [MFR(II)−MFR(I)] in melt flow rate is more preferably 2 to 25 g/10 min, more preferably 3 to 20 g/10 min, particularly preferably 5 to 17 g/10 min.

In the present invention, it is preferred that the melting point of the polyethylene-based resin is higher than that of TPO. When the melting point of the polyethylene-based resin is higher than the melting point of TPO, the expanded beads show more excellent in moldability and, further, the obtained molded article shows higher heat resistance. From the above point of view, the melting point of the polyethylene-based resin is preferably higher by 3° C. or more, more preferably by 5° C. or more, than the melting point of TPO. When the melting point of the polyethylene-based resin is higher than the melting point of TPO, there is no upper limit in the difference in temperature, but it is generally about 20° C.

It is also preferred that the heat of fusion of the polyethylene-based resin is higher than that of TPO. When the heat of fusion of the polyethylene-based resin is higher than the heat of fusion of TPO, the obtained expanded beads molded article has more excellent heat resistance. From the above point of view, the heat of fusion of the polyethylene-based resin is preferably higher by 20 J/g or more, more preferably 50 J/g or more, than the heat of fusion of TPO. When the heat of fusion of the polyethylene-based resin is higher than the heat of fusion of TPO, there is no upper limit in the difference, but it is generally about 150 J/g.

It is further preferred that the crystallization temperature of the polyethylene-based resin is higher than that of TPO. When the crystallization temperature of the polyethylene-based resin is higher than the crystallization temperature of TPO, the expanded beads show more excellent in moldability, and the obtained molded article shows higher heat resistance. From the above point of view, the crystallization temperature of the polyethylene-based resin is preferably higher by 5° C. or more, more preferably by 10° C. or more, than the crystallization temperature of TPO. When the crystallization temperature of the polyethylene-based resin is higher than the crystallization temperature of TPO, there is no upper limit in the difference in temperature, but it is generally about 25° C.

(Heat of Fusion of the Mixture)

In the present invention, it is preferred that the heat of fusion of the mixture of the olefin-based thermoplastic elastomer and the polyethylene-based resin is 40 to 120 J/g. When the heat of fusion of the mixture falls within the above range, the expanded beads show more excellent heat resistance, moldability, etc. and the obtained expanded beads molded article shows a lower degree of shrinkage. From the above point of view, the heat of fusion of the mixture is more preferably 50 to 100 J/g, still more preferably 55 to 90 J/g. The heat of fusion of the mixture is measured using a heat flux differential scanning calorimeter based on JIS K7122 (2012). When a plurality of melting peaks appear on the DSC curve, the total area of the plurality of melting peaks is taken as the heat of fusion.

(Melting Peak of Mixture)

In the present invention, it is preferred that the mixture of the olefin-based thermoplastic elastomer and the polyethylene-based resin has such a crystal structure that shows a single melting peak in a DSC curve thereof measured based on JIS K7121(2012). The fact that the mixture has a crystal structure showing a single melting peak indicates that the compatibility between TPO and the polyethylene-based resin is good. Therefore, the obtained expanded beads are capable maintaining excellent properties of TPO, such as tensile properties, in a more preferred manner, even though the polyethylene-based resin is contained in the base polymer. Additionally, the obtained expanded beads show excellent moldability, and the expanded beads molded article shows excellent heat resistance.

The DSC curve of the mixture is measured using a heat flux differential scanning calorimeter based on JIS K7121 (2012).

(Crystallization Temperature of the Mixture)

It is preferred that the crystallization temperature of the mixture of the olefin-based thermoplastic elastomer and the polyethylene-based resin is 105 to 125° C. When the crystallization temperature of the mixture falls within the above range, the expanded beads show more excellent moldability. From the above point of view, the crystallization temperature of the mixture is more preferably 108 to 123° C., particularly preferably 110 to 120° C.

The crystallization temperature is measured using a heat flux differential scanning calorimeter based on JIS K7121 (2012). When a plurality of crystallization peaks appear on the DSC curve, the peak temperature of the crystallization peak that has the highest peak height is taken as the crystallization temperature.

It is preferred that the crystallization temperature of the mixture of the olefin-based thermoplastic elastomer and the polyethylene-based resin is higher than the crystallization temperature of the olefin-based thermoplastic elastomer by itself, which temperature is measured by the same method as the crystallization temperature of the mixture. When the crystallization temperature of the mixture is higher than the crystallization temperature of TPO alone, the expanded beads show further excellent moldability. The reason for this has not yet been clarified, but is considered to be that crystallization of the mixture, which has a high crystallization temperature, takes place at a higher temperature so that shrinkage of the expanded beads molded article is suppressed during molding. From the above point of view, the crystallization temperature of the mixture is preferably higher by 3° C. or more, more preferably by 5° C. or more, than the crystallization temperature of TPO by itself. When the crystallization temperature of the mixture is higher than the crystallization temperature of TPO alone, there is no upper limit in the temperature difference, but it is generally about 20° C.

(Hot Xylene Insoluble Content of Expanded Beads (Gel Fraction))

It is preferred that the expanded beads of the present invention contain a hot xylene insoluble matters determined by a hot xylene extraction method for reasons that both excellent in-mold moldability of the expanded beads and excellent heat resistance can be achieved. For the above reason, the hot xylene insolubles content is preferably 10 to 70% by weight, more preferably 30 to 60% by weight. The hot xylene insolubles content is one of the indices that represent the crosslinked state of the expanded beads.

As used herein, the hot xylene insolubles content is measured as follows. About 1 g of a sample is weighed (the weighed mass of the sample is defined as G1 (g)) and boiled under reflux in 100 g of xylene for 6 hours. This is then quickly filtered through a 100-mesh wire net. Next, the boiling xylene insolubles remaining on the wire mesh are dried for 8 hours using a vacuum dryer at 80° C., and then the mass of the insolubles is weighed (the weighed mass of the boiling xylene insolubles is defined as G2 (g)). The hot xylene insolubles content is determined by the following formula (1):

$$\text{Hot xylene insolubles content(\% by weight)} = (G2/G1) \times 100 \qquad (1)$$

(Apparent Density of Expanded Beads)

It is preferred that the expanded beads of the present invention have an apparent density of 30 to 300 kg/m³, more preferably 30 to 150 kg/m³, still more preferably 35 to 120 kg/m³, particularly preferably 40 to 100 kg/m³, most preferably 45 to 80 kg/m³. When the apparent density of the expanded beads falls within the above range, it is possible to mold an expanded beads molded article having excellent lightness in weight, flexibility, resilience, recoverability, etc. Hitherto, an expanded beads molded article obtained by molding expanded beads having a low apparent density has been more likely to cause a change in size in a high temperature atmosphere. The expanded beads of the present invention, on the other hand, are capable of molding an expanded beads molded article that has excellent heat resistance and shows suppressed dimensional change in a high temperature atmosphere even when the apparent density thereof is small.

As used herein, the apparent density of the expanded beads is measured as follows. First, the expanded beads are allowed to stand for 2 days under conditions involving a relative humidity of 50%, a temperature of 23° C. and 1 atm. Next, a graduated cylinder containing water at a temperature of 23° C. is provided, and an arbitrary amount of the expanded beads (weight of the expanded beads is W1) are immersed in the water in the graduated cylinder using a tool such as a wire net. The rise of the water level is read, from which the volume V1 [L] of the expanded beads is determined in consideration of the volume of the tool such as a wire net. The apparent density of the expanded beads is obtained by dividing the weight W1 (g) of the expanded beads added in the graduated cylinder by the volume V1 [L] (W1/V1).

(Aspect Ratio of Expanded Beads)

It is preferred that the expanded beads of the present invention have an aspect ratio of 5.0 or less. The fact that the aspect ratio of the expanded beads in the present invention is within the above range means that the expanded beads have a spherical or oval shape. When the aspect ratio of the expanded beads falls within the above range, the filling efficiency thereof into a mold cavity at the time of molding thereof is improved so that the moldability becomes more excellent. From the above point of view, the aspect ratio of the expanded beads is more preferably 3 or less, more preferably 2 or less, particularly preferably 1.5 or less. The lower limit of the aspect ratio is 1.

The aspect ratio of an expanded bead is a value calculated as a ratio (L/D) of the maximum length (L) of the bead to the minimum diameter (D) of a cross-section of the particle that is normal to the direction of the maximum length L of the particle. The maximum length (L) of the particle and the minimum diameter (D) of the cross-section normal to the length direction of the maximum length L of the particle is able to be measured by a measuring tool such as a caliper.

(Average Cell Diameter of Expanded Beads)

Each of the expanded beads of the present invention has a multiplicity of cells formed or defined by cell walls formed of the base polymer. It is preferred that the expanded beads have an average cell diameter of 20 to 200 μm. When the average cell diameter of the expanded beads falls within the above range, in-mold moldability of the expanded beads is more excellent and the mechanical properties of the expanded beads molded article are more excellent. From this point of view, the average cell diameter is more preferably 40 to 180 μm, more preferably 60 to 160 μm, particularly preferably 80 to 140 μm.

The average cell diameter of expanded beads is measured in accordance with ASTM D3576-77 as follows. Fifty randomly selected expanded beads are each cut along a plane that passes through a center portion thereof and divided into two, and an enlarged photograph of the cross-section is taken. In each cross-sectional photograph, four angularly equally spaced apart (45 degrees) line segments, each of which passes through the center portion of the expanded bead, are drawn. The number of cells that intersect each line segment is counted. A total length of the four line segments is divided by a total number of the counts of the cells to obtain an average chord length of the cells, which is further divided by 0.616 to obtain an average cell diameter value of each expanded bead. The average cell diameter of the expanded beads is an arithmetic mean of the average cell diameter values of the 50 selected expanded beads.

<Method for Producing Expanded Beads>

A preferred method for producing the expanded beads of the present invention includes the following step (A), step (B), step (C) and step (D):

Step (A): a dispersing step of dispersing particles (hereinafter, occasionally referred to as "base polymer particles") comprised of a base polymer containing a mixture of TPO and a polyethylene-based resin (hereinafter, occasionally referred to as "TPO mixture") and, if desired, an additive as an optional component, and a crosslinking agent, in a dispersing medium in a closed vessel, Step (B): a crosslinking step of crosslinking the base polymer particles by heating same to a temperature (crosslinking temperature) above the temperature at which the TPO mixture is softened and the crosslinking agent is substantially decomposed, to obtain crosslinked particles, Step (C): an impregnating step of impregnating the crosslinked particles with a blowing agent by heating same at a predetermined temperature (impregnation temperature) for a predetermined time (impregnation time) to impregnate the blowing agent, Step (D): a foaming step of releasing the crosslinked particles that have been impregnated with the blowing agent and heated at a predetermined temperature (expansion temperature) from the inside of the closed vessel into an atmosphere having a pressure lower than the pressure inside the closed vessel to expand and foam the particles to produce expanded beads.

[Step A]

In step (A), the base polymer particles and the crosslinking agent are dispersed in the dispersing medium in the closed vessel. The closed vessel is a vessel that may be closed and can withstand increase of heating and pressure. An autoclave may be mentioned as an example thereof.

The base polymer particles may be produced by feeding TPO, polyethylene-based resin and additives as optional components to an extruder, kneading them to form a melt-kneaded product, extruding the melt-kneaded product from a small orifice of a die attached to the tip of the extruder into a strand form, and then subjecting the strand to a known granulation method such as a strand cutting method in which the strand is cut into a predetermined weight. In the above method, the base polymer particles may be obtained by, for example, cooling the melt-kneaded product extruded in the form of a strand with water and then cutting it into a predetermined length. To cut into a predetermined length so as to obtain the base polymer particles, there may be adopted, for example, a hot cutting method in which the melt-kneaded product is cut immediately after have been extruded or an underwater cutting method in which such a product is cut in water.

The average mass per one base polymer particle is generally preferably 0.01 to 10 mg, more preferably 0.1 to 5 mg. The average mass of the base polymer particles is a value obtained by dividing the mass (mg) of 100 randomly selected base polymer particles by 100.

(Dispersing Medium)

The dispersing medium used in step (A) is not particularly limited as long as it is a dispersing medium that does not dissolve the base polymer particles. Examples of the dispersing medium include water, ethylene glycol, glycerin, methanol, ethanol, etc. The preferred dispersing medium is water.

(Dispersion)

Base polymer particles are dispersed in the dispersing medium. For example, the base polymer particles are dispersed in the dispersing medium using a stirrer.

In step (A), a dispersing agent or a surfactant may be added to the dispersing medium. Examples of the dispersing agent include organic dispersing such as polyvinyl alcohol, polyvinylpyrrolidone and methyl cellulose, etc. and insoluble inorganic salts such as aluminum oxide, zinc oxide, kaolin, mica, magnesium phosphate and tricalcium phosphate. Examples of the surfactant include sodium oleate, sodium dodecylbenzenesulfonate and, rest, anionic surfactants and nonionic surfactants commonly used in suspension polymerization.

Further, in step (A), a pH adjusting agent may be added to the dispersing medium to adjust the pH of the dispersing medium. Further, in step (A), a blowing agent may be added to the dispersing medium. The blowing agent will be described in detail in Step (C).

The crosslinking agent may be added to the dispersing medium in advance, or may be added to the dispersing medium after the base polymer particles have been dispersed therein. The crosslinking agent is not particularly limited as long as it is capable of crosslinking the TPO mixture. It is preferred that a peroxide having a 10-hour half-life temperature of 100 to 125° C., such as dicumyl peroxide (10 hour half-life temperature: 116° C.), 2,5-t-butylperbenzoate (10 hour half-life temperature: 104° C.), etc. is used as the crosslinking agent. These peroxides are used singly or in combination of two or more. The amount of the crosslinking agent added to the dispersing medium is not particularly limited as long as the xylene insolubles content in the expanded beads can be adjusted to the above-mentioned range, but the addition amount of the crosslinking agent is preferably 0.1 to 5.0 parts by weight, more preferably 0.2 to 2.5 parts by weight, based on 100 parts by weight of the base polymer particles.

[Step (B)]

In step (B), the base polymer particles are heated in a closed vessel to a temperature (crosslinking temperature) above the temperature at which the base polymer particles dispersed in the dispersing medium in step (A) are softened and the crosslinking agent is substantially decomposed, and held for a predetermined time (holding time). By this, the TPO mixture is crosslinked to obtain crosslinked particles. The crosslinking temperature is not particularly limited, but is, for example, in the range of 100 to 170° C. The holding time at the crosslinking temperature is not particularly limited, but is, for example, 5 to 120 minutes, more preferably 10 to 90 minutes.

[Step (C)]

In step (C), a blowing agent for foaming the crosslinked particles is added, after the (B), to the dispersing medium in the closed vessel, and is impregnated into the crosslinked particles in the softened state. The impregnating temperature is not particularly limited as long as it is a temperature equal to or higher than the temperature at which the crosslinked particles are made into a softened state, but is, for example, in the range of 100 to 170° C. The impregnating time is preferably 15 to 60 minutes, more preferably 30 to 45 minutes.

(Blowing Agent)

The blowing agent used in step (C) is not particularly limited as long as it can foam and expand the crosslinked particles. Examples of the blowing agent include inorganic physical blowing agents such as air, nitrogen, carbon dioxide, argon, helium, oxygen and neon, and organic physical blowing agents such as aliphatic hydrocarbons, e.g. propane, normal butane, isobutane, normal pentane, isopentane and normal hexane, alicyclic hydrocarbons e.g. cyclohexane and cyclopentane, halogenated hydrocarbons, e.g. chlorofluoromethane, trifluoromethane, 1,1-difluoroethane, 1,1,1,2-tetrafluoroethane, methyl chloride, ethyl chloride and methylene chloride, and dialkyl ethers, e.g. dimethyl ether, diethyl ether and methyl ethyl ether. Above all, an inorganic physical blowing agent that does not destroy the ozone layer and is inexpensive is preferred. Thus, nitrogen, air and carbon dioxide are more preferable, and carbon dioxide is particularly preferable. These can be used singly or in combination of two or more thereof. The addition amount of the blowing agent is determined in consideration of the apparent density of the target expanded beads, the types of TPO and polyethylene-based resin, the kind of the blowing agent, etc., but is generally 5 to 50 parts by weight in the case of an organic physical blowing agent and 0.5 to 30 parts by weight in the case of an inorganic physical blowing agent both based on 100 parts by mass of the crosslinked particles. Incidentally, it is preferred that the above-mentioned crosslinking step, impregnating step and foaming step are carried out as a series of steps in a same closed vessel.

[Step D]

In the (D), the crosslinked particles that have been impregnated with the blowing agent and heated in step (C) are released into an atmosphere having a pressure lower than the pressure in the closed vessel to produce the expanded beads. Specifically, while maintaining the pressure within the closed vessel at a pressure equal to or higher than the vapor pressure of the blowing agent, one end located below the water level of the closed vessel is opened, so that the crosslinked particles impregnated with the blowing agent are released together with the dispersing medium from the closed vessel into an atmosphere having a pressure lower than the pressure in the closed vessel, generally atmospheric pressure, thereby to produce the expanded beads.

While a method in which a closed vessel is used has been described as the method for producing expanded beads, the method of producing the expanded beads is not limited to the above production method. For example, a method including feeding base polymer particles, a crosslinking agent and a blowing agent to an extruder, melting the feed therein to crosslink the base polymer particles and to impregnate the blowing agent, extruding and foaming the crosslinked particles from a die attached to the tip of the extruder to obtain foamed extrudates, and cutting them after cooling to pelletize into particles; a method including taking the crosslinked particles obtained in steps (A) to (C) out from the closed vessel, dehydrating and drying the crosslinked particles, then heating the crosslinked particles with a heating medium to foam them and to obtain expanded beads, and the like method may be adopted. Furthermore, although a method of crosslinking the base polymer particles using an organic peroxide has been described, the crosslinking step in the present invention is not limited to a method using an organic peroxide. Other known methods, for example a method in which the crosslinking step is carried out using an electron beam, may be adopted.

<Expanded Beads Molded Article>

By subjecting the expanded beads of the present invention to in-mold molding, it is possible to obtain an expanded beads molded article in which the expanded beads are fusion-bonded to each other.

(In-Mold Molding)

An expanded beads molded article may be obtained using a conventionally known method by filling expanded beads in a mold cavity and performing heat molding using a heating medium such as steam. Specifically, after filling the expanded beads in a mold cavity, a heating medium such as steam is fed into the mold cavity to heat and secondarily foam them and to fusion-bond them to each other, thereby obtaining an expanded beads molded article having a shape conforming to the mold cavity. It is preferred that the in-mold molding according to the present invention is carried out by a pressurizing molding method (for example, Japanese Examined Patent Publication No. S51-22951) in which the expanded beads are previously subjected to a pressurizing treatment with a pressurized gas such as air to increase the pressure inside the expanded beads to 0.01 to 0.2 MPa(G) (G: gauge pressure, the same applies below) the resulting expanded beads being, thereafter, filled into the mold cavity at atmospheric pressure or under reduced pressure, and, after closing the mold, a heating medium such as steam is fed into the mold to fusion-bond the expanded beads.

(Apparent Density)

The apparent density of the expanded beads molded article is preferably 20 to 300 kg/m$^3$, more preferably 20 to 150 kg/m$^3$, still more preferably 30 to 120 kg/m$^3$, particularly preferably 35 to 100 kg/m$^3$. When the apparent density of the expanded beads molded article falls within the above range, the expanded beads molded article shows a good balance of lightness in weight, flexibility, resilience, recoverability and tensile properties.

The apparent density may be determined as follows. The expanded beads molded article is allowed to stand for 2 days in an atmosphere of a relative humidity of 50%, a temperature of 23° C. and 1 atm. Next, a graduated cylinder containing water at a temperature of 23° C. is provided, and an arbitrary mass of the expanded beads molded article (weight: W) is immersed in the water in the graduated cylinder using a tool such as a wire net. The rise of the water level is read, from which the volume V [L] of the expanded beads molded article is determined in consideration of the volume of the tool such as a wire net. The apparent density of the expanded beads molded article is obtained by dividing the weight W (g) of the expanded beads molded article placed in the graduated cylinder by the volume V [L] (W/V).
(Type C Durometer Hardness)

The type C durometer hardness of the expanded beads molded article is preferably 5 to 70, more preferably 10 to 60, still more preferably 17 to 40. When the type C durometer hardness falls within the above range, the expanded beads molded article shows more excellent flexibility, recoverability, etc.

The type C durometer hardness is intended to mean a durometer hardness as measured using a type C durometer according to JIS K7312(1996).
(Tensile Strength, Tensile Elongation)

The tensile strength of the expanded beads molded article is preferably 0.2 MPa or more, more preferably 0.25 MPa or more, still more preferably 0.3 MPa or more. The upper limit of the tensile strength is not particularly specified, but it is generally about 1 MPa. When the tensile strength falls within the above range, the fusion-bonding property between the expanded beads of the expanded beads molded article is more improved so that the article becomes suitable for applications such as cushioning materials, sports pad materials, shoe sole materials and toys.

The tensile elongation of the expanded beads molded article is preferably 80% or more, more preferably 90% or more, still more preferably 100% or more. When the tensile elongation falls within the above range, the fusion-bonding property between the expanded beads of the expanded beads molded article is more improved so that the article becomes suitable for various applications such as cushioning materials, sport pad materials, shoe sole materials and toys.

The tensile strength and the tensile elongation may be determined by subjecting the expanded beads molded article to a tensile test according to JIS K6767(1999).
(Compression Set)

The compression set of the expanded beads molded article is preferably 5% or less, more preferably 3% or less, still more preferably 2% or less. Within the above range, the expanded beads molded article is excellent in shape recoverability after being compressed, so that the article becomes suitable for applications such as cushion materials, sport pad materials, shoe sole materials and toys.

The compression set of the expanded beads molded article may be measured based on JIS K6767(1999) at a temperature of 23° C.
(Modulus of Repulsion Elasticity)

The modulus of repulsion elasticity of the expanded beads molded article is preferably 45% or more, more preferably 50% or more, still more preferably 55% or more. The upper limit, on the other hand, is about 90%. When the modulus of repulsion elasticity falls within the above range, the resilience is more excellent so that the article may be suitably used for applications such as seat cushion materials, sports pad materials and shoe sole materials.

The modulus of repulsion elasticity of the expanded beads molded article is measured using a Schov type repulsion elasticity tester RT-90 (manufactured by Kobunshi Keiki Co., Ltd.) in accordance with JIS K6255(2013) under the conditions of relative humidity 50% and 23° C. Specifically, the modulus of repulsion elasticity is determined as follows. Five samples (with a molding skin) having a length of 30 mm, a width of 30 mm and a thickness of 12.5 mm are cut out from a center portion of the expanded beads molded article after being aged. Each sample is fixed to a predetermined part of the device with a double-sided tape. A pendulum having a hammer diameter of φ15 mm and an arm weight of 0.25 kg is allowed to be swung down from a position at a lifting angle of 90±1°. Thus, the pendulum is collided with the skin surface of the fixed sample in the thickness direction to measure a rebound height h (mm) of the pendulum. The rebound height h (mm) is divided by the pendulum fall height H (mm) of the pendulum. The average value of the measured values (N=5) represents the modulus of repulsion elasticity.
(Shrinkage Rate)

The shrinkage rate of the expanded beads molded article is preferably 10% or less, more preferably 8% or less. A shrinkage rate of the expanded beads molded article of 8% or less can be said to be more preferred embodiment from the standpoint of easiness in manufacture of the expanded beads molded article.

The shrinkage rate of the expanded beads molded article is determined as follows. The expanded beads molded article after having been molded is dried in an oven at 60° C. for 12 hours and then cooled to room temperature. The thus aged expanded beads molded article is measured for its length in the longitudinal direction. The shrinkage rate is calculated as a ratio of a difference between the dimension in the longitudinal direction of the molding mold and the dimension in the longitudinal direction of the expanded beads molded article with respect to the dimension in the longitudinal direction of the molding mold.
(Dimensional change rate upon heating)

The rate of dimensional change upon heating at 80° C. of the expanded beads molded article, which has an apparent density of 35 to 100 kg/m$^3$, is preferably −5 to 5%, more preferably −4 to 3%, still more preferably −3 to 1%. The rate of dimensional change upon heating at 100° C. of the expanded beads molded article, which has an apparent density of 35 to 100 kg/m$^3$, is preferably −12 to 5%, more preferably −10 to 3%, still more preferably −8 to 1%. When the dimensional change rate falls within the above range, the expanded beads molded article has a small dimensional change in a high temperature atmosphere and has an excellent heat resistance.

The dimensional change rate upon heating is measured according to the B method of JIS K6767(1999). Specifically, from the expanded beads molded article, a molded body having a 150 mm×150 mm size and a thickness that remains unchanged is cut out. On a central portion of the molded body, three straight lines which are parallel with each other and arranged at intervals of 50 mm are drawn in each of the longitudinal and transverse directions of the molded body. The three straight lines in each of the longitudinal and transverse directions are measured for their lengths, and the average value thereof is calculated to obtain an initial length ($L_0$). Then, the molded body is allowed to quiescently stand at 80° C. or 100° C. for 22 hours, taken out, and then allowed quiescently to stand at 23° C. for 1 hour. The molded body after the 1 hour standing is then subjected to the same measurement as that for the initial dimension, to obtain a dimension ($L_1$) after heating. The percentage of dimensional change before and after heating (($L_1-L_0$)/$L_0$×100) represents the dimensional change rate upon heating.

The present invention can provide expanded beads that are capable of molding an expanded beads molded article having excellent heat resistance while maintaining excellent tensile properties, recoverability, resilience, flexibility and moldability of olefin-based thermoplastic elastomer expanded beads, because the expanded beads are comprised of a mixture consisting of an olefin-based thermoplastic elastomer and a polyethylene-based resin, in which the melt flow rate MFR(I) of the olefin-based thermoplastic elastomer is 2 to 10 g/10 min, the difference [MFR(II)−MFR(I)] between a melt flow rate MFR(II) of the polyethylene-based resin and the melt flow rate MFR(I) of the olefin-based thermoplastic elastomer is 1 to 35 g/10 min, and a content of the polyethylene-based resin in the mixture is 3 to 40% by weight.

The expanded beads molded article obtained by in-mold molding of the expanded beads of the present invention may be used by itself, but may also be used in the form of a laminated article in which another material is laminated and adhered thereto. Such another material is not particularly limited, but is preferably an expanded beads molded body of a thermoplastic resin such as a polypropylene-based resin, a polyethylene-based resin, a polystyrene-based resin, a polyester-based resin, a polycarbonate-based resin, a polyamide-based resin, a composite resin of polyolefin and polystyrene (PO/PS composite resin) or a composite resin of polystyrene and polyphenylene ether. Above all, an expanded beads molded body formed of a polypropylene-based resin, a polyethylene-based resin, a polystyrene-based resin or a PO/PS composite resin is more preferred from the standpoint of lightness in weight and mechanical strengths, and an expanded beads molded body formed of a polypropylene-based resin is particularly preferred from the standpoint of heat resistance.

The above-mentioned laminated article is a laminate whose dimensional change is suppressed, since a shrinkage rate of the laminated article in a high temperature atmosphere is kept low as a whole.

In the above laminated article, a method for laminating an expanded beads molded article obtained from the expanded beads of the present invention and an expanded beads molded body of another material is not specifically limited. Such a laminated article may be obtained, for example, by a method in which both molded bodies are manufactured in separate steps, and then the two are formed into a laminated article by a method using an adhesive or by a thermal fusion bonding method. From the standpoint of productivity, it is preferred a method in which one molded body and another molded body are continuously molded using one mold cavity to integrally laminate and bond them together (integral molding).

The expanded beads molded article obtained by in-mold molding the expanded beads of the present invention is suitable for applications such as building materials, automobile members, vibration isolation materials, cushioning materials, sports pad materials, shoe sole materials, toys, etc.

EXAMPLE

The present invention will be next described in more detail by way of examples. The present invention is not limited to these examples, however.
<Mixture>

Evaluations of the mixtures used in Examples and Comparative Examples were performed as described below. As the mixtures, the base polymer particles described hereinbelow were used in each of Examples and Comparative Examples.
(Heat of Fusion)

The heat of fusion was calculated based on JIS K7122 (2012) from a melting peak of a DSC curve obtained using a heat flux differential scanning calorimeter (manufactured by SII Nano Technology Inc., model number: DSC7020) in such a way that a mixture of an olefin-based thermoplastic elastomer and a polyethylene-based resin was heated at a heating rate of 10° C./min from 23° C. to 200° C., then cooled at a cooling rate of 10° C./min from 200° C. to 30° C., and subsequently heated at a heating rate of 10° C./min from 30° C. to 200° C. When a plurality of melting peaks appeared on the DSC curve, the total area of the plurality of the melting peaks was taken as the heat of fusion.
(Melting Peak)

A DSC curve was obtained based on JIS K7121(2012) using a heat flux differential scanning calorimeter (manufactured by SII Nano Technology Inc., model number: DSC7020) in such a way that a mixture of an olefin-based thermoplastic elastomer and a polyethylene-based resin was heated at a heating rate of 10° C./min from 23° C. to 200° C., then cooled at a cooling rate of 10° C./min from 200° C. to 30° C., and subsequently heated at a heating rate of 10° C./min from 30° C. to 200° C. The shape of a melting peak on the DSC curve was observed. The peak top temperature of the melting peak was taken as the melting point of the mixture. When a plurality of melting peaks appeared on the DSC curve, the peak top temperature of the melting peak that had the largest area was taken as the melting point. When two melting peaks were observed, "double" is shown in Tables with the peak top temperature (melting point) of the melting peak having the second largest area being shown therein in parentheses.
(Crystallization Temperature)

A DSC curve was obtained based on JIS K7121(2012) using a heat flux differential scanning calorimeter (manufactured by SII Nano Technology Inc., model number: DSC7020) in such a way that a mixture of an olefin-based thermoplastic elastomer and a polyethylene-based resin was heated at a heating rate of 10° C./min from 23° C. to 200° C., then cooled at a cooling rate of 10° C./min from 200° C. to 30° C. The peak temperature of the crystallization peak on the DSC curve was taken as the crystallization temperature. When a plurality of crystallization peaks appeared on the DSC curve, the peak temperature of the crystallization peak having the highest peak height was taken as the crystallization temperature.
<Expanded Beads>

The following evaluations were performed on the expanded beads of Examples and Comparative Examples.
(Hot Xylene Insolubles Content (Gel Fraction))

The hot xylene insolubles content of the expanded beads was determined by the method described previously.
(Apparent Density)

The apparent density was determined by the method described previously.
(Expandability)

The expandability was evaluated from the apparent density of the expanded beads according to the following criteria. The expandability of the expanded beads was evaluated for those expanded beads that were obtained by expansion under the conditions involving an expanding temperature of 160° C. and a vapor pressure of 4.0 M Pa.

A: Less than 65 kg/m$^3$
B: 65 kg/m$^3$ or more and less than 70 kg/m$^3$
C: 70 kg/m$^3$ or more and less than 80 kg/m$^3$
D: 80 kg/m$^3$ or more
(Aspect Ratio of Expanded Beads)

The aspect ratio of the expanded beads was measured as follows. First, each of 100 expanded beads selected at random was measured with a caliper for the maximum length (L) thereof and the minimum diameter (D) of a cross section thereof taken along a line normal to the length direction of the maximum length L. The ratio (L/D) was calculated. The aspect ratio of the expanded beads was calculated by arithmetically averaging the obtained (L/D) values.

(Shape of Expanded Beads)

The shape of the expanded beads was evaluated as follows based on the value of the aspect ratio.
  Spherical: The aspect ratio is 1.5 or less.
  Oval: The aspect ratio is more than 1.5 and 5.0 or less.
  Flat: The aspect ratio is more than 5.0.

(Average Cell Diameter of Expanded Beads)

The average cell diameter of the expanded beads was determined by the method described previously.

<Expanded Beads Molded Article>

Evaluations of the expanded bead molded articles of Examples and Comparative Examples were carried out as follows.

(Apparent Density)

The apparent density of the expanded beads molded article was determined by the method described previously.

(Type C Durometer Hardness)

The type C durometer hardness of the expanded beads molded article was measured based on JIS K7312(1996). Specifically, the expanded beads molded article was mounted to a constant-pressure loader (manufactured by Kobunshi Keiki Co., Ltd., CL-150L) attached to a durometer C (manufactured by Kobunshi Keiki Co., Ltd., Asker rubber hardness meter type C). Measurement was carried out at arbitral 10 points of each of the both surfaces of the molded article except for its edge portions. The type C durometer hardness was determined by arithmetically averaging the measured values.

(Tensile Strength, Tensile Elongation)

The tensile strength and the tensile elongation of the expanded beads molded article were determined by performing a tensile test of the expanded beads molded article in accordance with JIS K6767(1999). Specifically, a cut piece was prepared from the expanded beads molded article using a vertical slicer so that all surfaces thereof were cut surfaces (the skin portion was removed). From the cut piece, a dumbbell No. 1 type (measurement part was 40 mm in length, 10 mm in width, and 10 mm in thickness) was cut out using a fret saw to obtain a test piece. The test piece was subjected to a tensile test at a test speed of 500 mm/min to measure the maximum load and the gage length at break during the test. The maximum tensile stress during tension represents the tensile strength and the elongation at break represents the tensile elongation.

(Compression Set)

The compression set of the expanded beads molded article was measured at a temperature of 23° C. based on JIS K6767(1999). Specifically, five test pieces each in a rectangular parallelepiped shape having a length of 50 mm, a width of 50 mm and a thickness of 25 mm were cut out from the expanded beads molded article such that the skin layer at the time of molding was excluded. These were allowed to stand at a temperature of 23° C. under a relative humidity of 50% for 22 hours while being compressed by 25% in the thickness direction. After 24 hours from the release of the compression, the thicknesses of the test pieces were measured to determine the compression set (%) thereof. The arithmetic mean value represents the compression set (%).

(Modulus of Repulsion Elasticity)

The modulus of repulsion elasticity of the expanded beads molded article was measured by the method described previously.

(Shrinkage Rate)

An expanded beads molded article molded using a flat plate-shaped mold having a length of 250 mm, a width of 200 mm and a thickness of 50 mm was dried and aged in an oven at 60° C. for 12 hours and then cooled to room temperature. The thus aged expanded beads molded article was measured for its longitudinal dimension ($L_B$). The ratio (($L_A-L_B$)/$L_A$×100) of the difference between the longitudinal dimension of the of the molding mold ($L_A$) and the longitudinal dimension of the expanded beads molded article ($L_B$) to the longitudinal dimension of the molding mold ($L_A$) represents the shrinkage rate of the expanded beads molded article.

(Dimensional Change Rate Upon Heating)

The rate of dimensional change upon heating of the expanded beads molded article was determined by the method described previously.

(Moldability of Expanded Beads)

Evaluations of the moldability of the expanded beads of Examples and Comparative Examples were carried out as follows. As used herein, "moldability" is intended to mean the over-all judgement of the above-mentioned fusion property, appearance and recoverability. For example, "expanded beads having good moldability" means that the expanded beads are capable of molding, at a specific molding pressure, an expanded beads molded article having a fusion bonding property, an appearance and a recoverability that are all evaluated as rank A.

(Fusion Bonding Property)

The fusion bonding property of the expanded beads molded article was evaluated by the following method. The expanded beads molded article was bent and broken. On the broken surface, the number of expanded beads that were present (C1) and the number of expanded beads that were broken (C2) were counted. A ratio (C2/C1×100) of the broken expanded beads to the expanded beads was calculated and taken as a material breakage rate. The measurement was performed 5 times using different test pieces to obtain respective material breakage rates. From the arithmetic mean of these material breakage rates, the fusion bonding property was evaluated based on the following criteria.
  A: Material breakage rate is 90% or more.
  B: Material breakage rate is 20% or more and less than 90%.
  C: Material breakage rate is less than 20%.

(Appearance (Degree of Interstices))

A rectangle of 100 mm×100 mm was drawn on a center part of the expanded beads molded article. A diagonal line segment was drawn from one corner of the rectangular area. The number of voids (interstices) having a size of 1 mm×1 mm or more on the line segment was counted. The surface appearance of the expanded beads molded article was evaluated as follows.
  A: The number of voids is less than 3.
  B: The number of voids is 3 or more and less than 5.
  C: The number of voids is 5 or more.

(Recoverability)

The obtained expanded beads molded article was measured for its thicknesses at a center portion and four corner portions. A ratio of the thickness of the center portion to the thickness of the thickest portion of the four corner portions was calculated, from which the recoverability was evaluated as follows.

A: When the thickness ratio is 95% or more.
B: Thickness ratio is 90% or more and less than 95%.
C: Thickness ratio is less than 90%.

(Range Permitting Molding)

The range permitting molding (MPa) is a molding pressure range within which an expanded beads molded article having the above-mentioned fusion bonding property, appearance and recoverability that are all evaluated as rank A is obtainable. The expanded beads that show good moldability at a plurality of molding pressures can be said to have a wide range permitting molding and to be more excellent in moldability. Further, the expanded beads that permit molding a low molding pressure are more excellent in moldability and, hence, the molding cycle is shortened and the productivity is improved.

<Production of Expanded Beads and Expanded Beads Molded Articles>

TPO and polyethylene-based resins used as main ingredients for producing expanded beads are shown in Table 1.

The melt flow rates of TPO and polyethylene-based resin were measured in accordance with JIS K7210-1(2014) under the conditions of a temperature of 190° C. and a load of 2.16 kg.

The melting point of each of TPO and polyethylene-based resin melting point of a mixture is a peak top temperature of a melting peak on a DSC curve thereof that is obtained using a heat flux differential scanning calorimeter (manufactured by SII Nano Technology Inc., model: DSC7020) based on JIS K7121(2012) by raising the temperature from 23° C. to 200° C. at a heating rate of 10° C./min, then cooling from 200° C. to 30° C. at a cooling rate of 10° C./min, and then heating from 30° C. to 200° C. at a heating rate of 10° C./min. When a plurality of melting peaks appeared on the DSC curve, the peak top temperature of the peak that has the largest area of all was taken as the melting point.

The heat of fusion of each of TPO and polyethylene-based resin is calculated from a melting peak on a DSC curve thereof that is obtained using a heat flux differential scanning calorimeter (SII Nano Technology Inc., model: DSC7020) based on JIS K7122(2012) by raising the temperature from 23° C. to 200° C. at a heating rate of 10° C./min, then cooling from 200° C. to 30° C. at a cooling rate of 10° C./min, and then raising from 30° C. to 200° C. at a heating rate of 10° C./min. When a plurality of melting peaks appeared on the DSC curve, the total area of the plurality of melting peaks was taken as the heat of fusion.

As for the flexural modulus, according to JIS K7171 (2016), TPO and polyethylene-based resin were each heat pressed at 230° C. to prepare a sheet having a thickness of 4 mm, from which a test piece (standard test piece) of 80 mm (length)×10 mm (width)×4 mm (thickness) was cut out and used. The radius R1 of the indenter and the radius R2 of the support were both 5 mm, the distance between fulcrums was 64 mm, and the test speed was 2 mm/min.

TABLE 1

| Material | Name | Grade | Maker | Density (g/cm³) | $T_m$ (° C.) | ΔH (J/g) | $T_c$ (° C.) | MFR (g/10 min) | Flexural modulus (MPa) |
|---|---|---|---|---|---|---|---|---|---|
| TPO | TPO1 | INFUSE9530 | Dow Chemical | 0.887 | 121 | 58 | 100 | 5 | 28 |
| HDPE | Resin 1 | NIPOLON HARD 1200 | Tosoh | 0.952 | 128 | 176 | 114 | 21 | 820 |
| HDPE | Resin 2 | NIPOLON HARD 2300 | Tosoh | 0.952 | 131 | 152 | 114 | 7 | 870 |
| LLDPE | Resin 3 | SUMIKATHENE-L GA802 | Sumitomo Chemical | 0.935 | 119 | 108 | 104 | 20 | 410 |
| HDPE | Resin 4 | NOVATEK HD HJ362 | Japan Polyethylene | 0.953 | 131 | 184 | 116 | 1 | 820 |
| LLDPE | Resin 5 | ELITE 5538G | Dow Chemical | 0.941 | 129 | 148 | 113 | 1.3 | 500 |
| LDPE | Resin 6 | NOVATEK LD LJ902 | Japan Polyethylene | 0.915 | 102 | 57 | 88 | 45 | 110 |
| LDPE | Resin 7 | NOVATEK LD LJ8041 | Japan Polyethylene | 0.918 | 101 | 80 | 90 | 23 | 150 |

Example 1

<Production of Expanded Beads>

A mixed raw material composed of 80% by weight of TPO1 as TPO and 20% by weight of Resin 1 as a polyethylene-based resin (the total of TPO and the polyethylene-based resin is 100% by weight) and 0.1 part by weight, based on 100 parts by weight of the mixed raw material, of zinc borate (hereinafter occasionally abbreviated as ZnB; Zinc Borate 2335 manufactured by Tomita Pharmaceutical Co., Ltd., average particle size: 6 μm) as a cell controlling agent were fed into an extruder, melt-kneaded at 230° C. therein and extruded from a die having a diameter of 2 mm in the form of strands. The extrudate was cooled in water and then cut with a pelletizer into particles each having a particle mass of about 5 mg, thereby obtaining base polymer particles. The base polymer particles (1 kg) were mixed with 3 liters of water as a dispersing medium, 3 g of kaolin as a dispersing agent, 0.04 g of sodium alkylbenzene sulfonate, and 0.85 parts by mass, based on 100 parts by mass of the base polymer particles, of dicumyl peroxide as a crosslinking agent. The mixture was heated to 110° C. and maintained for 30 minutes. Thereafter, 1.5 MPa of carbon dioxide as a blowing agent was injected into the closed vessel having a volume of 5 L. The temperature was raised to 160° C. as a crosslinking temperature/foaming temperature under stirring, and the mixture was held as such for 30 minutes to further impregnate carbon dioxide thereinto as the blowing agent. The pressure (vapor pressure) within the autoclave at this time was 4 MPa (G). Then, while maintaining the pressure, the contents in the closed vessel were released into the atmospheric pressure to obtain the expanded beads.

<Production of Expanded Beads Molded Article>

The expanded beads were placed in a closed vessel and pressurized with compressed air at 0.2 MPa(G) for 12 hours to impart an internal pressure of 0.10 MPa(G) to the inside of the expanded beads. After having been taken out, the expanded beads were filled in a flat mold having a length of 250 mm, a width of 200 mm and a thickness of 50 mm. In-mold molding was performed in such a way that the expanded beads were heated with steam under a molding pressure of 0.12 to 0.24 MPa(G) and, after cooling, a molded article was taken out from the mold. Further, the molded article was dried and aged by heating for 12 hours in an oven adjusted to 60° C. and then taken out therefrom to obtain an expanded beads molded article.

Example 2

Expanded beads and an expanded beads molded were obtained in the same manner as that in Example 1 except for using Resin 2 as the polyethylene-based resin.

Example 3

Expanded beads and an expanded beads molded were obtained in the same manner as that in Example 1 except for using Resin 3 as the polyethylene-based resin.

Example 4

Expanded beads and an expanded beads molded were obtained in the same manner as that in Example 1 except that the addition amounts of TPO1 and Resin 1 were changed to those shown in Table 2(1).

Example 5

Expanded beads and an expanded beads molded were obtained in the same manner as that in Example 1 except that the addition amounts of TPO1 and Resin 1 were changed to those shown in Table 2(1) and that dicumyl peroxide as a crosslinking agent was added in an amount of 0.9 part by mass relative to 100 parts by mass of the base polymer particles.

Example 6

Expanded beads and an expanded beads molded were obtained in the same manner as that Example 1 except for using Resin 7 as the polyethylene-based resin.

Comparative Example 1

Expanded beads and an expanded beads molded were obtained in the same manner as that in Example 1 except that the base polymer particles were prepared using TPO1 by itself without using a polyethylene-based resin and that dicumyl peroxide as a crosslinking agent was added in an amount of 0.80 part by mass relative to 100 parts by mass of the base polymer particles.

Comparative Example 2

Expanded beads and an expanded beads molded were obtained in the same manner as that in Example 1 except for using Resin 4 as the polyethylene-based resin.

Comparative Example 3

Expanded beads and an expanded beads molded were obtained in the same manner as that in Example 1 except for using Resin 5 as the polyethylene-based resin.

Comparative Example 4

Expanded beads and an expanded beads molded were obtained in the same manner as that in Example 1 except that the addition amounts of TPO1 and Resin 1 were changed to those shown in Table 4(1) and that dicumyl peroxide as a crosslinking agent was added in an amount of 1.0 part by mass relative to 100 parts by mass of the base polymer particles.

Comparative Example 5

Expanded beads and an expanded beads molded article were obtained in the same manner as that in Example 1 except for using Resin 6 as the polyethylene-based resin.

The production conditions, measurement results and evaluation results of the expanded beads and expanded beads molded articles of Examples 1 to 6 and Comparative Examples 1 to 5 are as shown in Tables 2(1), 2(2), 3(1), 3(2), 4(1), 4(2), 5(1) and 5(2). The physical properties of the expanded beads molded articles shown in Tables 2(2) and 4(2) are those of the expanded beads molded articles obtained by molding at the molding pressures shown in Tables 2(2) and 4(2).

TABLE 2

| | | | Example 1 | Example 2 | Example 3 | Example 4 | Example 5 | Example 6 |
|---|---|---|---|---|---|---|---|---|
| Formulation | TPO (I) | | TPO1 | TPO1 | TPO1 | TPO1 | TPO1 | TPO1 |
| | Addition amount | wt % | 80 | 80 | 80 | 95 | 70 | 80 |
| | Resin (II) | | Resin 1 | Resin 2 | Resin 3 | Resin 1 | Resin 1 | Resin 7 |
| | Addition amount | wt % | 20 | 20 | 20 | 5 | 30 | 20 |
| Properties of Raw Materials | Kind | | TPO | TPO | TPO | TPO | TPO | TPO |
| | MFR (I) | g/10 min | 5 | 5 | 5 | 5 | 5 | 5 |
| | Kind | | HDPE | HDPE | LLDPE | HDPE | HDPE | LDPE |
| | MFR (II) | g/10 min | 21 | 7 | 20 | 21 | 21 | 23 |
| | MFR (II) − MFR (I) | g/10 min | 16 | 2 | 15 | 16 | 16 | 18 |
| | Heat of fusion | J/g | 71 | 71 | 66 | 60 | 81 | 56 |
| | Melting peak shape | — | single | single | single | single | single | double |
| | Melting point | ° C. | 125 | 124 | 121 | 123 | 126 | 121/105 |
| | Crystallization temperature | ° C. | 110 | 110 | 107 | 106 | 111 | 109 |
| Expanding Conditions | Initial amount of blowing agent | MPa | 1.5 | 1.5 | 1.5 | 1.5 | 1.5 | 1.5 |
| | Amount of crosslinking agent | parts | 0.85 | 0.85 | 0.85 | 0.85 | 0.9 | 0.85 |
| | Impregnating temperature | ° C. | 110 | 110 | 110 | 110 | 110 | 110 |
| | Impregnating time | min | 30 | 30 | 30 | 30 | 30 | 30 |
| | Crosslinking/Expanding temperature | ° C. | 160 | 160 | 160 | 160 | 160 | 160 |
| | Holding time | min | 30 | 30 | 30 | 30 | 30 | 30 |
| | Vapor pressure | MPa(G) | 4 | 4 | 4 | 4 | 4 | 4 |

TABLE 2-continued

|  |  |  | Example 1 | Example 2 | Example 3 | Example 4 | Example 5 | Example 6 |
|---|---|---|---|---|---|---|---|---|
| Expanded Beads | Apparent density | kg/m$^3$ | 62 | 64 | 63 | 76 | 62 | 70 |
|  | Gel fraction | wt % | 49 | 46 | 49 | 49 | 48 | 46 |
|  | Expandability | — | A | A | A | C | A | B |
|  | Aspect ratio | — | 1.1 | 2.1 | 1.1 | 1.1 | 1.1 | 1.1 |
|  | Shape | — | spherical | oval | spherical | spherical | spherical | spherical |
|  | Average cell diameter | μm | 95 | 96 | 95 | 102 | 94 | 99 |
| Evaluation of Moldability | Range permitting molding | MPa(G) | 0.14-0.18 | 0.16-0.18 | 0.18-0.20 | 0.16 | 0.16-0.18 | 0.12 |
| Expanded Beads Molded Article | Molding pressure | MPa(G) | 0.16 | 0.16 | 0.18 | 0.16 | 0.16 | 0.12 |
|  | Apparent density | kg/m$^3$ | 38 | 45 | 52 | 50 | 39 | 49 |
|  | Type C Durometer hardness | — | 20 | 21 | 24 | 17 | 24 | 16 |
|  | Tensile strength | MPa | 0.28 | 0.30 | 0.40 | 0.3 | 0.33 | 0.25 |
|  | Tensile elongation | % | 101 | 105 | 110 | 144 | 103 | 120 |
|  | Compression set | % | 2 | 2 | 2 | 2 | 3 | 2 |
|  | Modulus of repulsion elasticity | % | 69 | 67 | 66 | 68 | 66 | 68 |
|  | Shrinkage rate | % | 7.3 | 5.5 | 7.0 | 8.5 | 4.5 | 8.0 |
| Dimensional Change Rate upon Heating | 80° C. | % | −1.4 | −1.4 | −2.0 | −1.7 | −1.2 | −2.3 |
|  | 100° C. | % | −4.4 | −4.7 | −8.1 | −7.3 | −5.2 | −11.8 |

TABLE 3

|  |  | Example 1 | Example 2 | Example 3 | Example 4 | Example 5 | Example 6 |
|---|---|---|---|---|---|---|---|
|  | TPO (I) | TPO1 | TPO1 | TPO1 | TPO1 | TPO1 | TPO1 |
| Addition Amount | wt % | 80 | 80 | 80 | 95 | 70 | 80 |
|  | Resin (II) | Resin 1 | Resin 2 | Resin 3 | Resin 1 | Resin 1 | Resin 7 |
| Addition Amount | wt % | 20 | 20 | 20 | 5 | 30 | 20 |
| Molding Pressure 0.12 MPa(G) | Fusion bonding property | A | B | C | A | B | A |
|  | Appearance | B | B | C | C | B | A |
|  | Recoverability | A | A | A | A | A | A |
| Molding Pressure 0.14 MPa(G) | Fusion bonding property | A | A | C | A | B | A |
|  | Appearance | A | B | B | B | A | A |
|  | Recoverability | A | A | A | A | A | B |
| Molding Pressure 0.16 MPa(G) | Fusion bonding property | A | A | B | A | A | A |
|  | Appearance | A | A | A | A | A | A |
|  | Recoverability | A | A | A | A | A | C |
| Molding Pressure 0.18 MPa(G) | Fusion bonding property | A | A | A | A | A | A |
|  | Appearance | A | A | A | A | A | A |
|  | Recoverability | A | A | A | B | A | C |
| Molding Pressure 0.20 MPa(G) | Fusion bonding property | A | A | A | A | A | A |
|  | Appearance | A | A | A | A | A | A |
|  | Recoverability | B | B | A | C | B | C |
| Molding Pressure 0.22 MPa(G) | Fusion bonding property | A | A | A | A | A | A |
|  | Appearance | A | A | A | A | A | A |
|  | Recoverability | C | C | B | C | C | C |
| Molding Pressure 0.24 MPa(G) | Fusion bonding property | A | A | A | A | A | A |
|  | Appearance | A | A | A | A | A | A |
|  | Recoverability | C | C | C | C | C | C |

TABLE 4

|  |  |  |  | Comparative Example 1 | Comparative Example 2 | Comparative Example 3 | Comparative Example 4 | Comparative Example 5 |
|---|---|---|---|---|---|---|---|---|
| Formulation |  | TPO (I) |  | TPO1 | TPO1 | TPO1 | TPO1 | TPO1 |
|  | Addition amount |  | wt % | 100 | 80 | 80 | 50 | 80 |
|  |  | Resin (II) |  | — | Resin 4 | Resin 5 | Resin 1 | Resin 6 |
|  | Addition amount |  | wt % | — | 20 | 20 | 50 | 20 |
| Properties of Raw Materials | Kind |  |  | TPO | TPO | TPO | TPO | TPO |
|  | MFR (I) |  | g/10 min | 5 | 5 | 5 | 5 | 5 |
|  | Kind |  |  | TPO | HDPE | LLDPE | HDPE | LDPE |
|  | MFR (II) |  | g/10 min | — | 1 | 1.3 | 21 | 45 |
|  | MFR (II) − MFR (I) |  | g/10 min | — | −4 | −3.7 | 16 | 40 |
|  | Heat of fusion |  | J/g | 56 | 80 | 70 | 81 | 54 |
|  | Melting peak shape |  | — | single | single | single | single | double |
|  | Melting point |  | ° C. | 121 | 127 | 124 | 126 | 121 (103) |
|  | Crystallization temperature |  | ° C. | 100 | 113 | 111 | 111 | 109 |
| Expanding Conditions | Initial amount of blowing agent |  | MPa | 1.5 | 1.5 | 1.5 | 1.5 | 1.5 |
|  | Amount of crosslinking agent |  | parts | 0.80 | 0.85 | 0.85 | 1.0 | 0.85 |
|  | Impregnating temperature |  | ° C. | 110 | 110 | 110 | 110 | 110 |
|  | Impregnating time |  | min | 30 | 30 | 30 | 30 | 30 |

TABLE 4-continued

|  |  |  | Comparative Example 1 | Comparative Example 2 | Comparative Example 3 | Comparative Example 4 | Comparative Example 5 |
|---|---|---|---|---|---|---|---|
| Expanded Beads | Crosslinking/Expanding temperature | °C. | 160 | 160 | 160 | 160 | 160 |
|  | Holding time | min | 30 | 30 | 30 | 30 | 30 |
|  | Vapor pressure | MPa(G) | 4 | 4 | 4 | 4 | 4 |
|  | Apparent density | kg/m³ | 77 | 81 | 82 | 70 | 64 |
|  | Gel fraction | wt % | 51 | 45 | 51 | 45 | 51 |
|  | Expandability | — | — | C | C | C | B | A |
|  | Aspect ratio | — | 1.1 | 20 | 8.3 | 1.2 | 1.2 |
|  | Shape | — | spherical | flat | flat | spherical | spherical |
|  | Average cell diameter | μm | 103 | 106 | 110 | 99 | 95 |
| Evaluation of Moldability | Range permitting molding | MPa(G) | 0.16 | € | € | 0.20-0.22 | € |
| Expanded Beads Molded Article | Molding pressure | MPa(G) | 0.16 | — | — | 0.22 | 0.12 |
|  | Apparent density | kg/m³ | 50 | — | — | 55 | 51 |
|  | Type C Durometer hardness | — | 17 | — | — | 28 | 16 |
|  | Tensile strength | MPa | 0.29 | — | — | 0.40 | 0.26 |
|  | Tensile elongation | % | 171 | — | — | 60 | 120 |
|  | Compression set | % | 2 | — | — | 3 | 2 |
|  | Modulus of repulsion elasticity | % | 68 | — | — | 60 | 68 |
|  | Shrinkage rate | % | 8.5 | — | — | 3.0 | 8.5 |
| Dimensional Change Rate upon Heating | 80° C. | % | −6.0 | — | — | −1.0 | −4.6 |
|  | 100° C. | % | −12.0 | — | — | −4.2 | −12.0 |

TABLE 5

|  |  | Comparative Example 1 | Comparative Example 2 | Comparative Example 3 |
|---|---|---|---|---|
|  | TPO (I) | TPO1 | TPO1 | TPO1 |
| Addition Amount | wt % | 100 | 80 | 80 |
|  | Resin (II) | — | Resin 4 | Resin 5 |
| Addition Amount | wt % | — | 20 | 20 |
| Molding Pressure 0.12 MPa(G) | Fusion bonding property | A | C | C |
|  | Appearance | C | C | C |
|  | Recoverability | A | A | A |
| Molding Pressure 0.14 MPa(G) | Fusion bonding property | A | C | C |
|  | Appearance | B | C | C |
|  | Recoverability | A | A | A |
| Molding Pressure 0.16 MPa(G) | Fusion bonding property | A | C | C |
|  | Appearance | A | C | C |
|  | Recoverability | A | A | A |
| Molding Pressure 0.18 MPa(G) | Fusion bonding property | A | B | B |
|  | Appearance | A | B | B |
|  | Recoverability | B | A | A |
| Molding Pressure 0.20 MPa(G) | Fusion bonding property | A | B | B |
|  | Appearance | A | B | B |
|  | Recoverability | C | A | B |
| Molding Pressure 0.22 MPa(G) | Fusion bonding property | A | B | B |
|  | Appearance | A | B | B |
|  | Recoverability | C | B | C |
| Molding Pressure 0.24 MPa(G) | Fusion bonding property | A | B | B |
|  | Appearance | A | B | B |
|  | Recoverability | C | C | C |

|  |  | Comparative Example 4 | Comparative Example 5 |
|---|---|---|---|
|  | TPO (I) | TPO1 | TPO1 |
| Addition Amount | wt % | 50 | 80 |
|  | Resin (II) | Resin 1 | Resin 6 |
| Addition Amount | wt % | 50 | 20 |
| Molding Pressure 0.12 MPa(G) | Fusion bonding property | C | A |
|  | Appearance | C | B |
|  | Recoverability | A | B |
| Molding Pressure 0.14 MPa(G) | Fusion bonding property | C | A |
|  | Appearance | C | A |
|  | Recoverability | A | B |
| Molding Pressure 0.16 MPa(G) | Fusion bonding property | C | A |
|  | Appearance | B | A |
|  | Recoverability | A | C |
| Molding Pressure 0.18 MPa(G) | Fusion bonding property | B | A |
|  | Appearance | B | A |
|  | Recoverability | A | C |

TABLE 5-continued

| | | | | |
|---|---|---|---|---|
| Molding Pressure 0.20 MPa(G) | Fusion bonding property | | A | A |
| | Appearance | | A | A |
| | Recoverability | | A | C |
| Molding Pressure 0.22 MPa(G) | Fusion bonding property | | A | A |
| | Appearance | | A | A |
| | Recoverability | | A | C |
| Molding Pressure 0.24 MPa(G) | Fusion bonding property | | A | A |
| | Appearance | | A | A |
| | Recoverability | | B | C |

The expanded beads molded article obtained from the expanded beads of Comparative Example 1 showed a large dimensional change upon heating at 80° C. and 100° C. and had insufficient heat resistance. The expanded beads of Comparative Examples 2 and 3 obtained from the expanded beads were flat in shape and were difficult to mold. The expanded beads molded article obtained from the expanded beads of Comparative Example 4 was inferior in tensile elongation. The expanded beads of Comparative Example 5 were inferior in moldability and, further, the expanded beads molded article obtained therefrom showed a large dimensional change upon heating of at 100° C. and had insufficient heat resistance. In comparison with these, it will be appreciated that Examples 1 to 6 can give expanded beads molded articles having excellent heat resistance while maintaining excellent tensile properties, recoverability, resilience, flexibility and moldability of TPO expanded beads.

Example 7

Expanded beads and an expanded beads molded article were obtained in the same manner as that in Example 1 except that the impregnated amount of carbon dioxide was changed so that the vapor pressure during expansion was 2.2 MPa(G).

Comparative Example 6

Expanded beads were obtained in the same manner as that in Comparative Example 1 except that the impregnated amount of carbon dioxide was changed so that the vapor pressure during expansion was 1.8 MPa(G).

The production conditions, measurement results and evaluation results of the expanded beads and expanded beads molded articles of Example 7 and Comparative Example 6 are shown in Tables 6(1), 6(2) and 7. The physical properties of the expanded beads molded article of Table 6(2) show the physical properties of the expanded beads molded article obtained by molding under the molding pressure indicated in Table 6(2).

TABLE 6

| | | | Example 7 | Comparative Example 2 |
|---|---|---|---|---|
| Formulation | TPO I | | TPO1 | TPO1 |
| | Addition amount | wt % | 80 | 100 |
| | Resin II | | Resin 1 | — |
| | Addition amount | wt % | 20 | — |
| Properties of Raw Materials | Kind | | TPO | TPO |
| | MFR I | g/10 min | 5 | 5 |
| | Kind | | HDPE | — |
| | MFR II | g/10 min | 21 | — |
| | MFR II / MFR I | g/10 min | 16 | — |
| | Heat of fusion | J/g | 71 | 56 |
| | Melting peak shape | — | single | single |
| | Melting point | ° C. | 125 | 121 |
| | Crystallization temperature | ° C. | 110 | 100 |
| Expanding Conditions | Initial amount of blowing agent | MPa | 1.5 | 1.5 |
| | Amount of crosslinking agent | parts | 0.85 | 0.80 |
| | Impregnating temperature | ° C. | 110 | 110 |
| | Impregnating time | Min | 30 | 30 |
| | Crosslinking/Expanding temperature | ° C. | 160 | 160 |
| | Holding time | min | 30 | 30 |
| | Vapor pressure | MPa(G) | 2.2 | 1.8 |

| | | | Example 7 | Comparative Example 6 |
|---|---|---|---|---|
| Expanded Beads | Apparent density | kg/m³ | 144 | 131 |
| | Gel fraction | wt % | 46 | 51 |
| | Expandability | — | — | — |
| | Aspect ratio | — | 1.1 | 1.1 |
| | Shape | — | spherical | spherical |
| | Average cell diameter | μm | 142 | 135 |
| Evaluation of Moldability | Range permitting molding | MPa(G) | 0.16-0.22 | 0.16-0.20 |
| Expanded Beads Molded Article | Molding pressure | MPa(G) | 0.20 | 0.20 |
| | Apparent density | kg/m³ | 96 | 99 |
| | Type C Durometer hardness | — | 43 | 30 |
| | Tensile strength | MPa | 0.67 | 0.55 |

TABLE 6-continued

|  |  |  | Example 7 | Comparative Example 6 |
|---|---|---|---|---|
|  | Tensile elongation | % | 207 | 180 |
|  | Compression set | % | 2 | 2 |
|  | Modulus of repulsion elasticity | % | 60 | 62 |
|  | Shrinkage rate | % | 3.5 | 4.5 |
| Dimensional Change Rate upon Heating | 80° C. | % | −1.0 | −1.3 |
|  | 100° C. | % | −2.0 | −3.8 |

TABLE 7

|  |  | Example 7 | Comparative Example 6 |
|---|---|---|---|
|  | TPO (I) | TPO1 | TPO1 |
| Addition Amount | wt % | 80 | 100 |
|  | Resin (II) | Resin 1 | — |
| Addition Amount | wt % | 20 | — |
| Molding Pressure 0.12 MPa(G) | Fusion bonding property | B | C |
|  | Appearance | B | C |
|  | Recoverability | A | A |
| Molding Pressure 0.14 MPa(G) | Fusion bonding property | A | C |
|  | Appearance | B | B |
|  | Recoverability | A | A |
| Molding Pressure 0.16 MPa(G) | Fusion bonding property | A | A |
|  | Appearance | A | A |
|  | Recoverability | A | A |
| Molding Pressure 0.18 MPa(G) | Fusion bonding property | A | A |
|  | Appearance | A | A |
|  | Recoverability | A | A |
| Molding Pressure 0.20 MPa(G) | Fusion bonding property | A | A |
|  | Appearance | A | A |
|  | Recoverability | A | A |
| Molding Pressure 0.22 MPa(G) | Fusion bonding property | A | A |
|  | Appearance | A | A |
|  | Recoverability | A | B |
| Molding Pressure 0.24 MPa(G) | Fusion bonding property | A | A |
|  | Appearance | A | A |
|  | Recoverability | B | C |

Although the expanded beads molded article obtained using the expanded beads of Comparative Example 6 had a high density, the heat resistance thereof was slightly inferior. In contrast, it will be appreciated that Example 7 was capable of producing an expanded beads molded article having excellent heat resistance while maintaining the excellent tensile properties, recoverability, resilience, flexibility and moldability of the TPO expanded beads.

The invention claimed is:

1. Expanded beads comprising a mixture consisting of 60 to 97% by weight of an olefin-based thermoplastic elastomer and 3 to 40% by weight of a polyethylene-based resin, said olefin-based thermoplastic elastomer having a melt flow rate MFR(I) and said polyethylene-based resin having a melt flow rate MFR(II), wherein MFR(I) is 2 to 10 g/10 min and a difference [MFR(II)−MFR(I)] between MFR(II) and MFR (I) is 1 to 35 g/10 min.

2. Expanded beads according to claim 1, wherein the olefin-based thermoplastic elastomer is a block copolymer having a hard segment comprised of a polyethylene block and a soft segment comprised of an ethylene/α-olefin copolymer block.

3. Expanded beads according to claim 1, wherein the polyethylene-based resin is one or two or more polyethylene-based resins selected from the group consisting of high density polyethylene and linear low density polyethylene.

4. Expanded beads according to claim 1, wherein the polyethylene-based resin is high density polyethylene.

5. Expanded beads according to claim 1, wherein the difference [MFR(II)−MFR(I)] between the melt flow rate MFR(II) of the polyethylene-based resin and the melt flow rate MFR(I) of the olefin-based thermoplastic elastomer is 1 to 25 g/10 min.

6. Expanded beads according to claim 1, wherein the mixture of an olefin-based thermoplastic elastomer and a polyethylene-based resin has such a crystal structure that shows a single melting peak in a DSC curve thereof measured based on JIS K7121(2012).

7. Expanded beads according to claim 1 which have a hot xylene insolubles content of 10 to 70% by weight.

8. Expanded beads according to claim 1 which have an apparent density of 30 to 150 kg/m$^3$.

9. An expanded beads molded article, comprising a multiplicity of the expanded beads according to claim 1 that are fusion-bonded to each other.

* * * * *